United States Patent [19]

Holcomb et al.

[11] Patent Number: 4,936,037

[45] Date of Patent: Jun. 26, 1990

[54] PISTOL WITH CONCEALED RADIO TRANSMITTER

[75] Inventors: Jack N. Holcomb, 1400 NW. 62nd St., Fort Lauderdale, Fla. 33307; Konrad K. Pangratz, Fort Lauderdale, Fla.

[73] Assignee: Jack N. Holcomb, Fort Lauderdale, Fla.

[21] Appl. No.: 375,958

[22] Filed: Jul. 5, 1989

[51] Int. Cl.⁵ .................... F41C 27/00; H04B 1/03
[52] U.S. Cl. .................... 42/106; 340/539; 340/568; 379/434; 379/440; 455/66
[58] Field of Search .................... 42/106; 455/66, 89, 455/90; 379/428, 434, 440; 340/539, 567, 693

[56] References Cited

U.S. PATENT DOCUMENTS

| | | | |
|---|---|---|---|
| 2,319,627 | 5/1943 | Perlman | 455/66 |
| 3,868,573 | 2/1975 | Holcomb et al. | 455/89 |
| 3,985,977 | 10/1976 | Beaty et al. | 455/66 |
| 4,008,478 | 2/1977 | Ikrath et al. | 42/106 |
| 4,107,611 | 8/1978 | Holcomb et al. | 455/66 |

Primary Examiner—Charles T. Jordan
Assistant Examiner—Michael J. Carone
Attorney, Agent, or Firm—Oltman and Flynn

[57] ABSTRACT

A Browning high power pistol with a concealed radio transmitter. The wood side pieces on the hollow gun handle are recessed to hold a microphone and radio transmitter circuitry in one side piece and an antenna, including its ground plane, in the other. The usual magazine casing is modified to have a false bottom and a compartment below the false bottom for receiving a standard 9-volt battery. The usual spring-operated pusher for bullets is in the magazine casing above the false bottom. The wood side piece holding the battery and its ground plane support a pair of switch contacts that are engaged by switch contacts on the outside of the magazine casing when the magazine casing is fully inserted into the gun handle. These switch contacts, when engaged, connect the battery to the transmitter circuitry and the antenna.

15 Claims, 3 Drawing Sheets

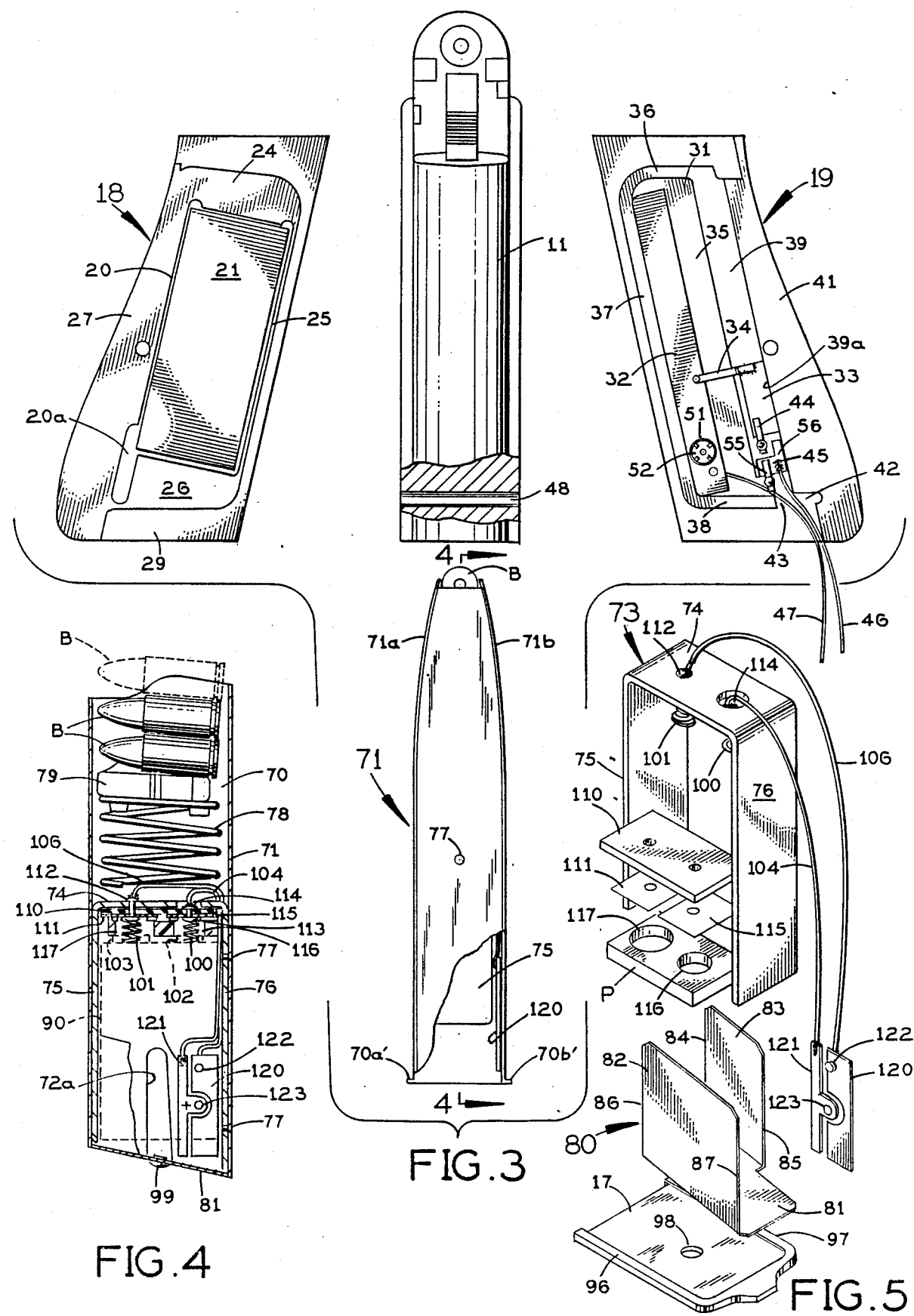

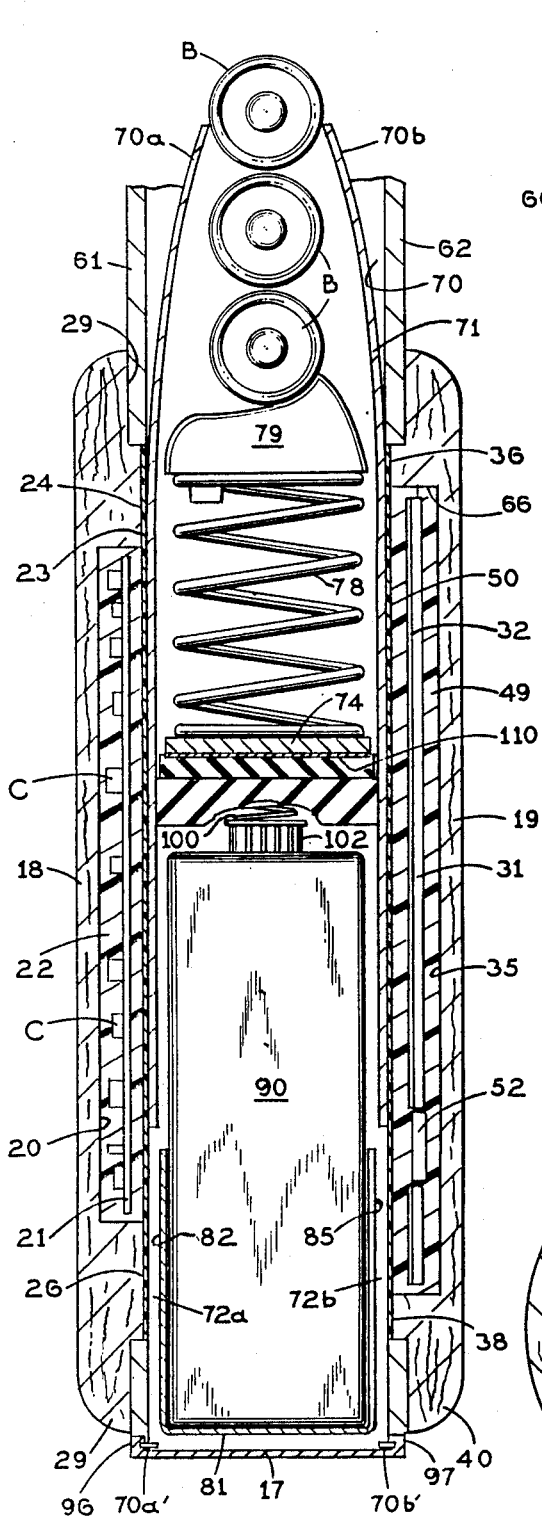
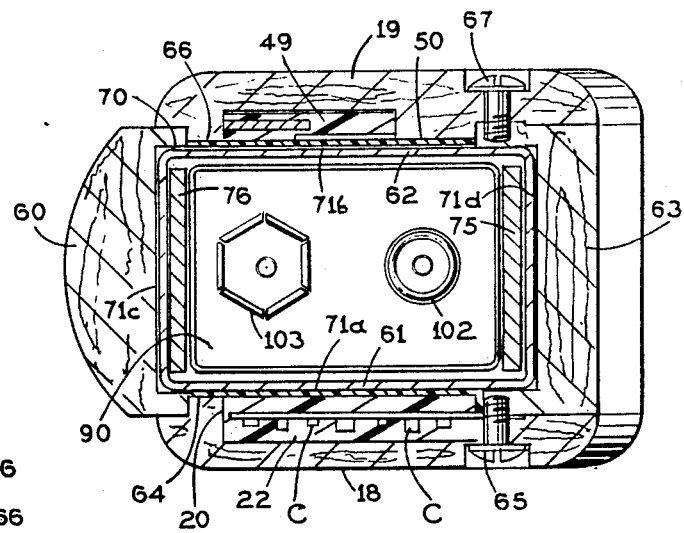
FIG. 7
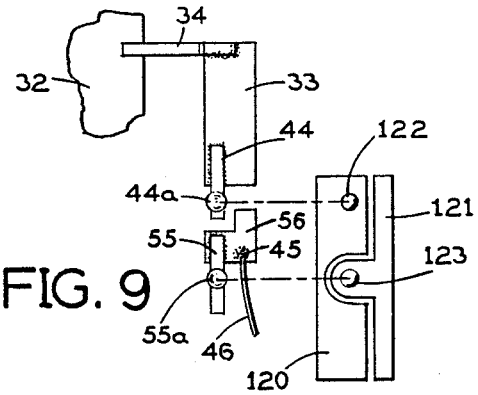
FIG. 9
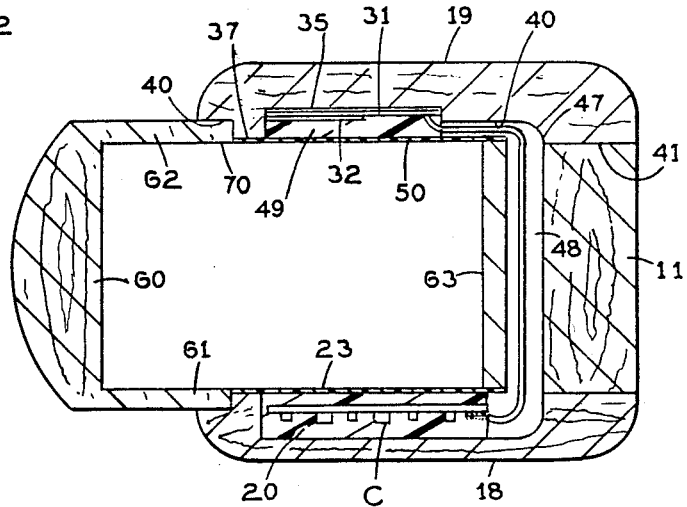
FIG. 6
FIG. 8

PISTOL WITH CONCEALED RADIO TRANSMITTER

SUMMARY OF THE INVENTION

This invention relates to a high power pistol with a concealed radio transmitter for use by a law enforcement agent or a witness cooperating with the government to make a sound recording of a conversation that might incriminate a criminal suspect and/or to protect the law enforcement agent or cooperating witness.

Criminals generally, and particularly those trafficking illegally in controlled substances, are vigilant and suspicious of anything that might be used to record an incriminating conversation. To some extent, a Browning single action pistol is not likely to arouse suspicion because a hand gun is a common tool of their own trade. Nonetheless, every precaution should be taken to insure that the criminal suspect is not alerted to the fact that the gun has a radio transmitter capable of broadcasting what he or she is saying to a sound recording device located elsewhere.

In accordance with the present invention, the handle of a Browning high power automatic pistol is modified to contain a very small radio transmitter that will broadcast conversations conducted in the vicinity of the pistol, in addition to a magazine containing bullets that can be fired by the pistol in the usual way. Preferably, in accordance with the present invention, the wooden side pieces on the outside of the gun handle are hollowed out to hold radio transmitter circuitry and a microphone on one side and an antenna on the opposite side. A magazine casing, identical in appearance to the usual magazine for such a hand gun, contains three or four bullets at the top and a battery below for powering the transmitter.

A principal object of this invention is to provide a Browning pistol modified to include in its handle a microphone for picking up voice conversations in its vicinity, a radio transmitter including an antenna for broadcasting those conversations, and a magazine casing holding a battery for powering the transmitter and capable of holding several bullets that can be fired by the gun in a normal manner.

Further objects and advantages of this invention will be apparent from the following detailed description of a presently preferred embodiment which is illustrated schematically in the accompanying drawings.

DESCRIPTION OF THE DRAWINGS

FIG. 3 is a composite view showing (1) the gun handle partly in end elevation and partly in section, (2) in elevation, the inside of the wood side piece on the left side of the gun handle, (3) in elevation, the inside of the wood side piece on the right side of the gun handle, and (4) the magazine partly in end elevation and partly in section;

FIG. 4 is a longitudinal section through the magazine taken along the line 4—4 in FIG. 3;

FIG. 5 is an exploded perspective view showing the parts of the magazine holder and the bottom end plate for the gun handle;

FIG. 6 is a section taken along the line 6—6 in FIG. 1 longitudinally through the gun handle with a radio transmitter therein in accordance with this invention;

FIG. 7 is a cross-section through the gun handle taken along the line 7—7 in FIG. 1;

FIG. 8 is a cross-section taken along the line 8—8 in FIG. 1 near the lower end of the gun handle; and FIG. 9 is a fragmentary exploded perspective view showing switch contacts on one of the side pieces of the gun handle and on the magazine casing.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
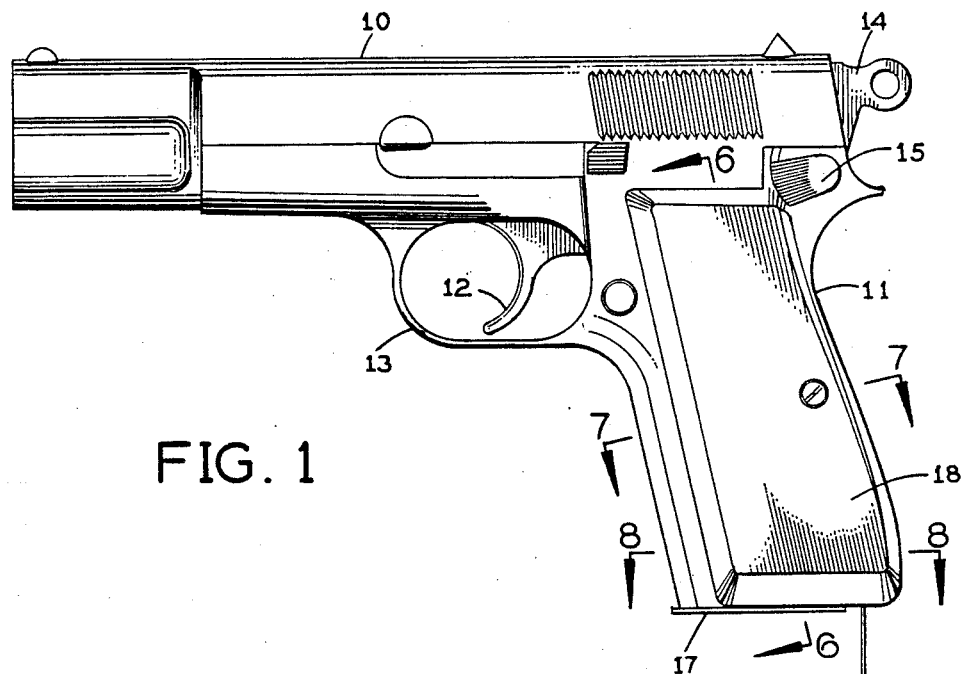
FIG. 1 is a side elevation of a Browning pistol modified internally to include a radio transmitter in accordance with the present invention.

Referring first to FIG. 1, the gun shown there is a Browning 9 mm. high power, automatic pistol having a gun barrel 10, a handle 11 extending down from the barrel at its rear end, a trigger 12, a trigger guard 13, a hammer 14 and a safety 15. The handle 11 is hollow from top to bottom. As shown in FIGS. 6-8, the Browning pistol has wood side pieces 18 and 19 on the left and right sides, respectively, of its handle 11.

Figure 2:
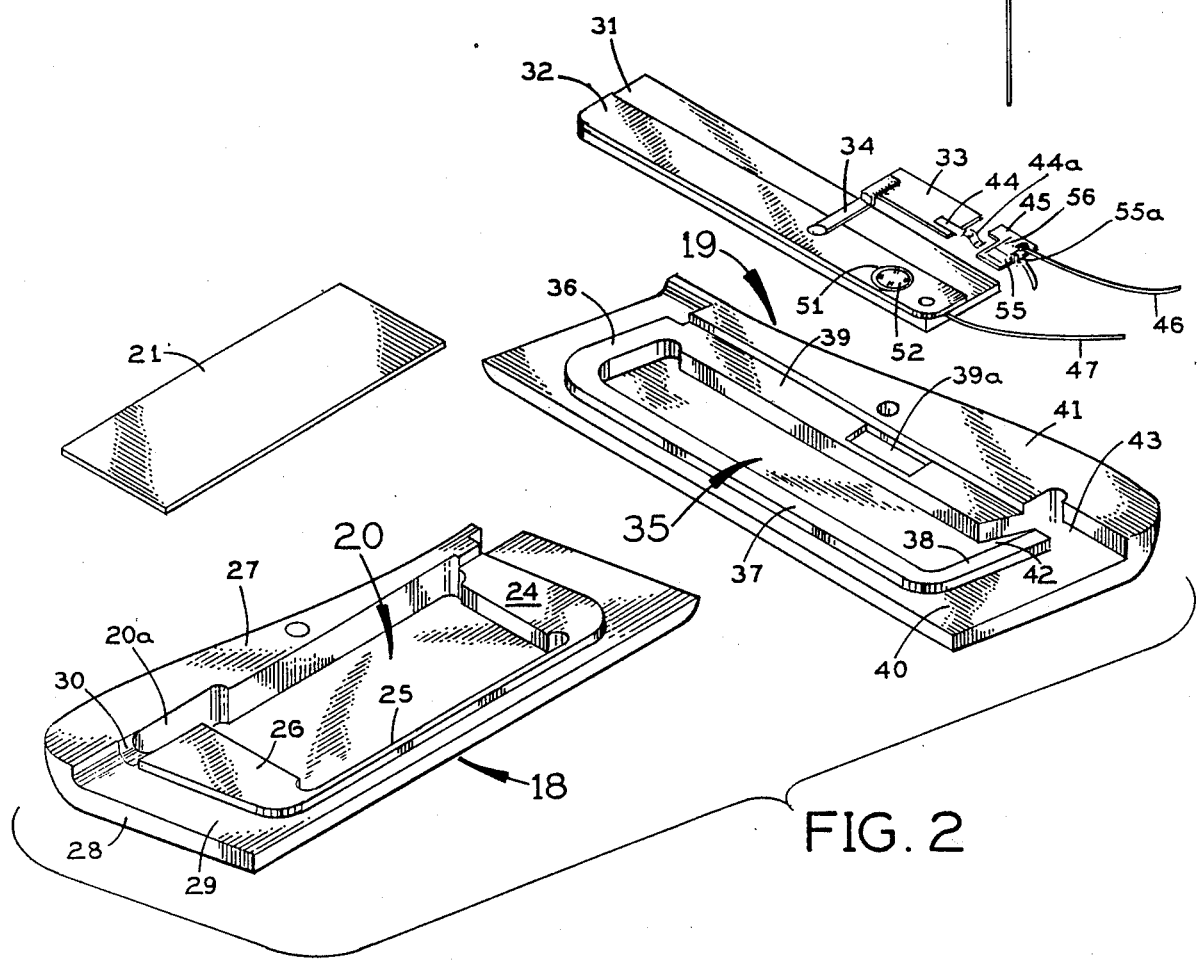
FIG. 2 is an exploded perspective view showing the two wood side pieces on the outside of the handle of this gun and the radio transmitter elements on the inside of those side pieces.

In accordance with the present invention, the wood side piece 18 (FIG. 2) on the left side of the gun handle is hollowed out on the inside to provide a shallow recess 20 for receiving a thin, flat printed circuit board 21 carrying a microphone and the components C of a radio transmitter (FIGS. 6-8). Preferably, the transmitter is a crystal-controlled transmitter operating at a selected frequency within one of several VHF high band frequency ranges, including the 140-174 megaHertz range. The microphone and the radio transmitter components are all on the outer major face of circuit board 21. The inner major face of circuit board 21 is flat and entirely free of any protrusions or attachments, as shown in FIG. 2. The circuit board 21 and transmitter components C are "potted" in a suitable epoxy resin 22 which fills the remainder of recess 20 in this handle side piece 18.

A thin, flat, plastic sheet 23 extends across the flat inside face of the resin potting 22 and is adhesively bonded to the inside of the wood side piece 18 around the periphery of its recess 20 at top, front side and bottom. As shown in FIG. 2, the inside of the wood side piece 18 presents a flat surface 24 along the top of recess 20, a narrow flat surface 25 along the front of recess 20, and a flat surface 26 along the bottom of this recess. Surfaces 24,25 and 26 are coplanar and these are the surfaces to which the plastic sheet 23 is adhesively attached. Along the rear of recess 20, the wood side piece 18 has a flat inside surface 27 (FIG. 2) that is offset from surfaces 24,25 and 26 farther into the handle in a side-to-side direction.

For most of its extent, the recess 20 in the wood side piece 18 is rectangular (FIG. 2) and it snugly receives the transmitter and microphone circuit board 21 as shown in FIG. 4. At its lower rear corner, recess 20 presents a narrower extension 20a, which extends down toward the bottom edge 28 of the wood side piece 18 next to its flat inside surface 27 at the rear. The wood side piece 18 on the inside is slightly recessed at 29 around the top, front and bottom surfaces 24,25 and 26 and it has a shallow groove 30 connecting the lower end of its recess extension 20a to the recessed area 29 between its bottom surface 26 and the bottom edge 28 of side piece 18. This recessed area 29, groove 30 and extension 20a of the recess 20 receive electrical wiring which connects the transmitter circuit board 21 to a battery and an antenna.

The wood side piece 19 on the right side of the gun handle is hollowed out on the inside to provide a shallow recess 35 (FIG. 2) for holding an antenna connected to the output of the radio transmitter in recess 20 in the other wood side piece 18 to broadcast conversations picked up by the microphone in recess 20.

Recess 35 is generally rectangular and it is longer and narrower than the recess 20 on the inside of the other wood side piece 18 on the gun handle. Recess 35 is bordered along the top by a flat surface 36, along the front by a flat surface 37, along the bottom by flat surface 38, and along the back by a flat surface 39. Surfaces 36,37,38 and 39 are coplanar. The inside of the wood side piece is slightly recessed at 40 around its surfaces 36,37 and 38 at the top, front and bottom of recess 35. Along the back at the inside, the wood side piece presents an offset flat surface 41 that is disposed farther in form the outside of this piece than the surfaces 36–39 bordering the recess 35. A shallow rectangular recess 39a is formed at surface 39 next to the offset surface 41. A narrow groove 42 extends from the lower rear corner of recess 35 through the inner rear segment which presents surface 39. A short wide opening 43 extends from groove 42 into the recessed area 40 below the surface 38 bordering recess 35 along the bottom.

The recess 35 in the wood side piece snugly receives a printed circuit board 31 which on its lower major face in FIG. 2 carries a tuned loop radiating element of the antenna. Thus, the radiating element is on the face of board 31 that is toward the outside of side piece 19.

On its opposite major face (at the top in FIG. 2) the circuit board 31 carries a long flat metal piece 32 which constitutes the major part of the ground plane of the antenna. A circular opening 51 extends through circuit board 31 and plate 32 near their lower end. A tuning capacitor 52 for the antenna is positioned in this opening. A smaller flat metal piece 33, which provides the remainder of the ground plane, is seated in the shallow recess 39a at the inside of side piece 19 in its flat surface 39 behind recess 35. A short copper strap 34 connects plates 32 and 33.

An upper electrical contact member 44 is soldered at its upper end to the smaller ground plane piece 33 and extends down from it, presenting a laterally inwardly protruding, rounded segment 44a for engagement by a corresponding electrical contact on another part of the present assembly, as explained hereinafter.

Closely below the smaller ground plane piece 33 a thin flat insulation piece 45 is affixed to the inside of the wood side piece 19 of the gun handle. This insulation piece supports a lower electrical contact member 55 similar to upper contact member 44 and vertically aligned with it. Contact member 55 presents a laterally inwardly protruding, rounded segment 55a for engagement by a corresponding contact on the aforementioned other part of the present assembly. A small piece 56 of metal foil engages the mounted end of lower contact member 55. An insulated electrical conductor 46 is soldered to foil piece 56 and is thereby connected electrically to lower contact member 55.

Another insulated conductor 47 is soldered at one end to the radiating element of the antenna. Conductor 47 extends from the antenna circuit board 31 through groove 42 and opening 43 on the inner face of the wood piece 19 into the recessed area 40 at the bottom of this piece. The other conductor 46 extends from foil piece 56 through the opening 43 into this same recessed area.

As shown in FIGS. 3 and 8, the metal handle 11 of the gun has a cylindrical bore 48 extending between the recessed area 29 at the bottom of the left-hand wood side piece 18 and the recessed area 40 at the bottom of the right-hand wood side piece 19. This bore passes the wiring 46 and 47 connecting the lower contact member 55 and the antenna in side piece 19 to the transmitter circuit in side piece 18.

As shown in FIG. 6, the antenna circuit board 31 and the elements on it and tuning capacitor 52 are embedded in a suitable epoxy resin potting compound 49 which fills the remainder of recess 35 on the inside of the wood side piece 19. A thin plastic sheet 50 extends across this potting and is adhesively secured to the surfaces 36,37,38 and 39 bordering the recess 35.

As shown in FIGS. 7 and 8, the metal gun handle 11 is generally rectangular in cross-section, presenting a front wall 60 with a convex outer face, left and right side walls 61 and 62, and a back wall 63. The left side wall 61 of handle 11 has an opening 64 which snugly receives the inwardly projecting segments of the wood side piece 18 which border its recess 20 on the inside. The plastic sheet 23 covering the resin potting 22 on the inside of the wood side piece 18 is flush with the inside face of handle 11 bordering its opening 64. A screw-threaded bolt 65 attaches the wood side piece 18 to the side wall 61 of gun handle 11.

Similarly, the opposite side wall 62 of handle 11 has an opening 66 which snugly receives the inwardly projecting segments of the wood side piece 19 bordering its recess 35 on the inside. The plastic sheet 50 covering the potting 49 on the inside of the side piece 19 is flush with the inside face of handle 11 bordering its opening 66. A screw-threaded bolt 67 attaches the wood side piece 19 to the right side wall 62 of metal handle 11.

The front, side and back walls 60–63 of the metal handle 11 border a cavity 70 of large cross-sectional size which extends the entire length of handle 11. This cavity has a rectangular cross-section. The protective plastic sheets 23 and 50 on the inside of the wood side pieces 18 and 19 are on opposite sides of cavity 70.

A bullet magazine casing 71, shown in the lower half of FIGS. 3 and 4, is snugly but slidably received in the gun handle cavity 70. As shown in FIG. 7, this magazine casing has wider opposite sides 71a and 71b, which extend parallel to the sides 61 and 62 of gun handle 11, and narrower opposite sides 71c and 71d, which extend parallel to the front and back walls 60 and 63 of the gun handle. For more than half of its extends upward from its lower end the magazine casing has a hollow rectangular cross-section. The wider opposite sides 71a and 71b of the magazine casing have aligned slots 72a and 72b therein (FIGS. 4 and 6) which are open at the respective bottom edges of these sides. As shown in FIGS. 3 and 6, these wider sides of the magazine converge at the upper end of the magazine body. An elongated, inverted, channel-shaped insert 73 (FIG. 5) is received in the lower half of the magazine casing, presenting a flat top wall 74 that extends completely across the inside of the magazine casing and opposite back and front legs 75 and 76 extending down from the top wall 74 along the inside of the narrower sides of magazine casing 71. Leg 76 of insert 73 is fastened to the contiguous front side 71c of the magazine casing 71 by screws 77 (FIG. 4).

The top wall 74 of insert 73 provides a false bottom for the longitudinal cavity 70 in magazine casing 71. A coil spring 78 is engaged under compression between wall 74 and a pusher or follower 79 that is slidable up along the inside of cavity 70. As many as three or four bullets B can be stacked in the magazine casing 70 as shown in FIG. 4, with the lowermost bullet engaging the top of pusher or follower 79 and the uppermost bullet engaged between the converging opposite wider sides of the magazine casing, as shown in FIG. 3.

Referring to FIG. 5, the open lower end of the magazine insert 73 slidably receives a generally channel-shaped bottom piece 80 having a flat bottom wall 81 and upstanding flat, opposite side walls 82 and 83. Side wall 82 extends up along the inside of the left side wall 71a of magazine casing 71, and side wall 83 extends up along the inside of the magazine casing's right side wall 71b. Side wall 83 has a front edge 84 which extends in close proximity to the front side 71c of the magazine casing and a rear edge 85 which is spaced a substantial distance from the rear side 71d of the magazine casing. Side wall 82 has a front edge 86 extending in close proximity to the front side 71c of the magazine casing and a rear edge 87 extending in close proximity to the rear side 71d of the magazine casing. The bottom piece 80 straddles leg 75 of the magazine insert 73 adjacent the front edges 84 and 86 of its sides 83 and 82, respectively. At its opposite ends, the bottom wall 81 of bottom piece 80 engages the bottom edges of legs 75 and 76 of the magazine insert 73.

As shown in FIG. 6, a 9 volt alkaline or lithium battery 90 is received snugly between the magazine insert 73 and the bottom piece 80, with the bottom of this battery resting on the bottom wall 81 of bottom piece 80 and the positive and negative terminals at the top of the battery engaging spring contacts 100 and 101 projecting down from the top wall 74 of magazine insert 73.

As shown in FIG. 4 a thin glass plate 110 is adhesively attached to the bottom of the top wall 74 of magazine insert 73. A small metal foil piece 111 on the bottom of plate 110 engages the upper end of spring contact 101. FIG. 5 shows these parts in exploded perspective. A rivet 112 extends through the top wall 74 of the magazine insert, the glass plate 110 and foil piece 111 and grounds the upper end of spring contact 101 to magazine insert 73, as well as physically attaching the upper end of contact spring 101 to glass plate 110 and the magazine insert's top wall 74. Rivet 112 makes metal-to-metal contact with the top wall 74 of the magazine insert. Above this wall the top of this rivet is soldered to one end of an insulated conductor 106. The opposite end of this conductor is soldered to an electrically conductive plate 120 (FIG. 5) on the inside of the magazine casing's side wall 71b near its lower end, as explained hereinafter.

Another rivet 113 is received in an opening 114 in the top wall 74 of magazine insert such that there is no metal-to-metal contact between them and rivet 113 is insulated from this wall of the magazine insert by the air space between them. A small metal foil piece 115 on the bottom of glass plate 110 engages the upper end of contact spring 100. Rivet 113 attaches the upper end of contact spring 100 physically to glass plate 110 and thus to the top wall 74 of magazine insert 73. However, contact spring 100 is electrically insulated from the magazine insert. The top of rivet 113 is soldered to one end of an insulated conductor 104. As shown in FIG. 5, the opposite end of conductor 104 is soldered to a second electrically conductive plate 121 on the inside of the magazine casing's side wall 71b near its lower end.

A small block P of suitable insulation material, such as polyvinyl chloride, is adhesively attached to the bottom of glass plate 110. This block has a smaller diameter vertical opening 116 which receives contact spring 100. Opening 116 is large enough to pass the usual positive terminal 102 on the top of battery 90 but too small to receive the negative battery terminal 103. Block P also has a larger diameter vertical opening 117 which is large enough to receive the negative terminal 103 of the battery. Thus, block P prevents the insertion of a battery with the positive and negative terminals incorrectly positioned. That is, only the positive battery terminal 102 can engage the positive polarity contact spring 100.

Near its lower rear corner on the inside, the side wall 71b of the magazine casing 71 supports two thin, electrically conductive, metal plates 120 and 121 (FIG. 4). Plate 120 has metal-to-metal contact with this side wall of the magazine casing whereas plate 121 is electrically insulated from it by a thin insulation layer between them. Plates 120 and 121 are spaced apart slightly so they are electrically separate.

Plate 120 carries an upper contact member 122 which is exposed at the outer face of magazine side wall 71b. Contact member 122 is positioned on this side wall of the magazine so that on the outside of this side wall it engages the upper contact 44 on the inside of the wood side piece 19 on the gun handle when the magazine casing 71 is fully inserted into the gun handle, as indicated schematically in FIG. 9.

Plate 121 carries a lower contact member 123 which is exposed at the outer face of the magazine side wall 71b but is electrically insulated from this side wall. The lower contact member 123 is vertically aligned with the upper contact member 122 and is spaced below it the same distance that the lower contact 55 on the side piece 19 of the gun handle is spaced from the upper contact 44 there.

Therefore, when the magazine casing 71 is fully inserted into the gun handle, the insulated lower contact 123 on the magazine engages the insulated lower contact 55 in the inside of the gun handle's right hand side piece 19, and the upper contact 122 on the magazine engages the upper contact 44 on side piece 19. Thus, the contacts 44 and 55 on the gun handle's side piece 19 and the contacts 122 and 123 on the magazine casing act as switches which are closed by the full insertion of the magazine casing 71 into the longitudinal cavity 70 in the gun handle. The closing of these switches completes the energization circuits from battery 90 to the radio transmitter, microphone and antenna.

A bottom plate 17 of the magazine extends below the bottom wall 81 of the bottom piece 80 for the magazine. Referring to FIG. 5, bottom plate 17 has upwardly projecting flanges 96 and 97 along its opposite sides which have grooves on the inside (FIG. 6) for snugly but slidably engaging outwardly protruding flanges 70a' and 70b' on the bottom edges of the wider sides 70a and 70b of magazine casing 70. As shown in FIG. 5, bottom plate 17 has a central opening 98 that snaps over a rounded projection 99 (FIG. 4) on the bottom wall 81 of bottom piece 80 when the parts are fully assembled.

With this arrangement, the slidable insertion of the magazine assembly, including magazine casing casing 71, battery 90 and bottom piece 80, into the cavity 70 in the gun handle closes the switches 44,122 and 55,123 to supply power to the transmitter and the antenna, making the transmitter fully operation. From the outside the gun handle looks the same as the usual handle on a Browning high power pistol and bullets may be fired from this pistol in the usual way. Therefore, there is no reason for suspicion on the part of a criminal suspect that this is anything but an ordinary Browning pistol of this type and the suspect may be lulled into a false sense of security inducing him or her to talk freely.

I claim:

1. A Browning pistol having a hollow metal handle with a longitudinal cavity therein between opposite sides of said handle, said cavity being open at the lower end of said handle for the slidable insertion and removal of a magazine for holding bullets, and wood side pieces on the outside of said metal handle on said opposite sides of the handle;

said wood side pieces having recesses therein which are open next to said cavity in the metal handle;

a microphone, a radio transmitter and an antenna received in said recesses;

a hollow magazine casing slidably insertable into and removable from said longitudinal cavity in said handle through said open lower end;

an insert in said magazine casing presenting a top wall which extends across the inside of the magazine casing at a location therein spaced substantially from the upper and lower ends of said magazine casing;

a spring-operated follower in said magazine casing above said top wall for pushing bullets up along the inside of said magazine casing;

said magazine casing and said insert defining a battery chamber inside the casing located below said top wall of said insert and shaped and dimensioned to receive a standard 9-volt battery with positive and negative terminals at the top;

a pair of spring contacts extending down from said top wall of the insert at the upper end of said battery chamber for engaging respectively said positive and negative terminals of a 9-volt battery received in said battery chamber;

electrical wiring on said magazine casing and inside said gun handle for connecting said transmitter and antenna to said spring contacts for the battery terminals;

and a bottom plate detachably secured to the lower end of said magazine casing.

2. A pistol according to claim 1 and further comprising:

first and second exposed switch contact on the inside of one of said wood side pieces;

and first and second exposed switch contacts on the outside of said magazine casing which respectively engage said contacts on said one side piece when the magazine casing is fully inserted into said cavity in the gun handle;

and wherein said electrical wiring includes:

insulated conductors connecting said switch contacts on said one wood side piece to said transmitter and antenna;

and insulated conductors connecting said switch contacts on said magazine casing to said spring contacts for the battery terminals.

3. A pistol according to claim 2 wherein:

said one wood side piece holds said antenna and a ground plane for the antenna;

said first switch contact on said one wood side piece is grounded to said ground plane for the antenna;

said second switch contact on said one wood side piece is electrically insulated from said ground plane;

said magazine casing is of electrically conductive material;

said first switch contact on the magazine casing is grounded to the magazine casing and connected by one of said conductors to said spring contact for the negative battery terminal;

and said second switch contact on the magazine casing is electrically insulated from the magazine casing and connected by one of said conductors to said spring contact for the positive battery terminal.

4. A pistol according to claim 3 and further comprising:

an insulation member on said insert below said top wall of the insert, said insulation member having a larger opening receiving the spring contact for the negative battery terminal and a smaller opening receiving the spring contact for the positive battery terminal, said smaller opening being too small to receive the negative terminal of a standard 9-volt battery.

5. A pistol according to claim 4 wherein:

said magazine casing has front, rear and opposite sides;

and said insert is attached to said magazine casing and has opposite legs extending down from said top wall along the inside of said magazine casing next to said front and rear sides of the magazine casing.

6. A pistol according to claim 5 and further comprising:

a bottom piece for the magazine casing having a bottom wall shaped and dimensioned to close the lower end of said battery chamber in the said magazine casing and opposite side walls extending up from said bottom wall into said magazine along said opposite sides of the magazine casing between said opposite legs of said insert, said bottom wall of said bottom piece for the magazine casing being located directly above said bottom plate on said magazine casing.

7. A pistol according to claim 1 and further comprising:

an insulation member on the bottom of said top wall of the insert having a larger opening receiving the spring contact for the negative battery terminal and a smaller opening receiving the spring contact for the positive battery terminal, said smaller opening being too small to receive the negative terminal of a standard 9-volt battery.

8. A pistol according to claim 1 wherein:

said magazine casing has front, rear and opposite sides;

and said insert is attached to said magazine casing and has opposite legs extending down from said top wall along the inside of said magazine casing next to said front and rear sides of the magazine casing.

9. A pistol according to claim 8 and further comprising:

a bottom piece for the magazine casing having a bottom wall shaped and dimensioned to close the lower end of said battery chamber in the said magazine casing and opposite side walls extending up from said bottom wall into said magazine along said opposite sides of the magazine casing between said opposite legs of said insert, said bottom wall of said bottom piece for the magazine casing being located directly above said bottom plate on said magazine casing.

10. A pistol having a hollow handle with a longitudinal cavity therein, said cavity being open at the lower end of said handle for the slidable insertion and removal of a magazine for holding bullets;

a microphone, a radio transmitter and an antenna received in said handle;

a hollow magazine casing slidably insertable into and removable from said longitudinal cavity in side handle through said open lower end;

means providing a false bottom in said magazine casing spaced substantially from the upper and lower ends of said magazine casing;

a follower in said magazine casing above said false bottom for pushing bullets up along the inside of said magazine casing;

said magazine casing having a battery chamber therein below said false bottom for receiving a battery with positive and negative terminals;

a pair of spring contacts in said battery chamber for engaging respectively said positive and negative terminals of a battery received in said battery chamber;

and switch means for connecting said spring contacts for the battery terminals to said transmitter and antenna when the magazine casing is in said cavity in the handle.

11. A pistol according to claim 10 wherein said switch means comprises a pair of switch contacts in said handle on one side of said cavity therein and a pair of corresponding switch contacts on the outside of said magazine casing which respectively slidably engage said switch contacts in the handle when the magazine casing is fully inserted into said cavity in the handle, and further comprising:

insulated conductors in the handle connecting said switch contacts in the handle to the transmitter and antenna;

and insulated conductors on the magazine connecting said spring contacts for the battery terminals to said switch contacts on the outside of the magazine casing.

12. A pistol according to claim 11 wherein:

said handle holds said antenna and a ground plane for the antenna on said one side of said cavity in the handle;

one of said switch contacts in said handle is grounded to said ground plane for the antenna;

the other of said switch contacts in said handle is electrically insulated from said ground plane;

said magazine casing is of electrically conductive material;

one of said switch contacts on the magazine casing is grounded to the magazine casing and connected by one of said conductors to said spring contact for the negative battery terminal;

and the other of said switch contacts on the magazine casing is electrically insulated from the magazine casing and connected by another of said conductors to said spring contact for the positive battery terminal.

13. A pistol according to claim 12 and further comprising:

an insulation member in said magazine casing below said false bottom, said insulation member having a larger opening receiving the spring contact for the negative battery terminal and a smaller opening receiving the spring contact for the positive battery terminal, said smaller opening being too small to receive the negative terminal of a standard 9-volt battery.

14. A Browning pistol having a hollow metal handle with a longitudinal cavity having openings along opposite sides of said handle and being open at the lower end of said handle for the slidable insertion and removal of a magazine for holding bullets, and wood side pieces on the outside of said metal handle on said opposite sides of the handle, said side pieces closing said openings along said opposite sides of the metal handle;

said wood side pieces having recesses therein which are open next to said cavity in the metal handle and exposed to said cavity;

a microphone and a radio transmitter in a recess in one of said side pieces;

an antenna having a radiating element and a ground plane in recesses in the other of said side pieces;

a pair of switch contacts on said other side piece which are exposed to said cavity in the metal handle near the lower end of said cavity;

one of said switch contacts being grounded to said ground plane of the antenna;

an insulated conductor connecting the other of said contacts to said transmitter;

a hollow electrically conductive magazine casing slidably insertable into and removable from said longitudinal cavity in said handle through said open lower end;

a pair of switch contacts on the outside of said magazine casing slidably engaging said switch contacts on said other wood side piece of the handle when the magazine casing is fully inserted into said cavity in said handle, one of said switch contacts on the outside of said magazine casing being grounded to said magazine casing;

an insert in said magazine casing presenting a top wall which extends across the inside of the magazine casing at a location therein spaced substantially from the upper and lower ends of said magazine casing, said insert being affixed to said magazine casing and having front and rear legs extending down from said top wall closely along the inside of the magazine casing;

a spring-operated follower in said magazine casing above said top wall for pushing bullets up along the inside of said magazine;

said magazine casing and said insert defining a battery chamber inside the casing located below said top wall of said insert and shaped and dimensioned to receive a standard 9-volt battery with positive and negative terminals at the top;

a pair of spring contacts extending down from said top wall of the insert at the upper end of said battery chamber for engaging respectively said positive and negative terminals of a 9-volt battery received in said battery chamber;

an insulation member on the bottom of said top wall of the insert having a larger opening receiving the spring contact for the negative battery terminal and a smaller opening receiving the spring contact for the positive battery terminal, said smaller opening being too small to receive the negative terminal of a standard 9-volt battery;

a pair of insulated conductors respective connecting said spring contact for the negative battery terminal to said one switch contact on the outside of the magazine casing and connecting said spring contact for the positive battery terminal to the other of said switch contacts on the outside of the magazine casing;

a bottom piece for the magazine casing having a bottom wall shaped and dimensioned to close the lower end of said battery chamber in the said magazine casing and opposite side walls extending up from said bottom wall into said magazine along said opposite sides of the magazine casing between said opposite front and rear legs of said insert;

and a bottom plate slidably attached to the lower end of said magazine casing directly below the lower end of said magazine casing and said front and rear legs of said insert and directly below said bottom piece for the magazine casing.

15. A pistol according to claim 14 and further comprising:

a first electrically conductive plate on the inside of the magazine casing near its lower end and connected to said one switch contact on the outside of the magazine casing;

and a second electrically conductive plate on the inside of the magazine casing in close proximity to said first plate and connected to said other switch contact on the outside of the magazine casing, said second plate and said other switch contact to which it is connected being electrically insulated from the magazine casing;

said first and second plates being spaced from said bottom piece for the magazine casing.

* * * * *